(12) United States Patent
Matsuno et al.

(10) Patent No.: US 7,901,822 B2
(45) Date of Patent: Mar. 8, 2011

(54) FUEL CELL AND VOLTAGE SUPPLY METHOD

(75) Inventors: Toshiyuki Matsuno, Tokyo (JP); Chiaki Kanai, Kanagawa (JP)

(73) Assignee: Sony Corporation, Tokyo (JP)

( * ) Notice: Subject to any disclaimer, the term of this patent is extended or adjusted under 35 U.S.C. 154(b) by 601 days.

(21) Appl. No.: 10/558,573

(22) PCT Filed: Jun. 1, 2004

(86) PCT No.: PCT/JP2004/007909
§ 371 (c)(1),
(2), (4) Date: Jan. 25, 2007

(87) PCT Pub. No.: WO2005/006478
PCT Pub. Date: Jan. 20, 2005

(65) Prior Publication Data
US 2007/0111061 A1    May 17, 2007

(30) Foreign Application Priority Data

Jun. 5, 2003 (JP) .............................. P2003-160669
Jul. 7, 2003 (JP) .............................. P2003-271571

(51) Int. Cl.
*H01M 8/04* (2006.01)
*H01M 8/24* (2006.01)

(52) U.S. Cl. ......... 429/432; 429/428; 429/430; 429/452; 429/535

(58) Field of Classification Search ............ 429/23, 429/9, 13, 34; 307/66, 71
See application file for complete search history.

(56) References Cited

U.S. PATENT DOCUMENTS 5,436,513 A * 7/1995 Kaye et al. .............. 307/71
2004/0229095 A1 * 11/2004 Pearson .................... 429/23

FOREIGN PATENT DOCUMENTS

| JP | 57-80677 | | 5/1982 |
| JP | 61-69339 | | 4/1986 |
| JP | 61-193375 | | 8/1986 |
| JP | 2001068139 A | * | 3/2001 |
| JP | 2001-102074 | | 4/2001 |

OTHER PUBLICATIONS

Machine Translation and Abstract in English of JP 2001-068139.*
Japanese Office Action issued on Feb. 16, 2010 in connection with corresponding JP Application No. 2003-271571.

* cited by examiner

*Primary Examiner* — Dah-Wei D Yuan
*Assistant Examiner* — Claire L Rademaker
(74) *Attorney, Agent, or Firm* — SNR Denton US LLP (57) ABSTRACT

Disclosed herein are a fuel cell and a voltage supply method which are designed to supply power to various electric circuits in a stable manner.
The fuel cell of stack structure with output terminals attached to different generating elements as mentioned above produces a potential across the output electrodes which corresponds to the number of generating cells connected in series. The output terminals are connected respectively to the potential regulators varying in the allowable voltage range and the ratio of voltage conversion. A large output voltage is obtained if the generating units are connected in series, and a large output current is obtained if the generating units are connected in parallel. Thus the fuel cell can supply an adequate amount of power in response to load operation.

10 Claims, 7 Drawing Sheets

FUEL CELL AND VOLTAGE SUPPLY METHOD

TECHNICAL FIELD

The present invention relates to fuel cell and a voltage supply method. More particularly, the present invention relates to a fuel cell and a voltage supply method which are designed to supply current to loads varying in working voltage.

BACKGROUND ART

The fuel cell is a device to generate electricity by electrochemical reaction between fuel and oxygen (oxidizing gas). It has recently come into the spotlight because it gives off only water after reaction without environmental pollution. Attempts are being made to use it as a power source to drive an automobile or as a household cogeneration system.

Active developmental works are under way to apply the fuel cell not only to the automotive power source etc. mentioned above but also to portable electronic equipment such as notebook personal computers, mobile phones, and PDAs (Personal Digital Assistant). The fuel cell for this purpose is required to constantly produce a rated power and have an adequate size and weight convenient for carrying. Technologies to meet this requirement are under development.

Some of recent electrical products have more functions and higher performance than before and hence they are provided with several electric circuits for individual functions, so that each electric circuit is driven at an adequate voltage. In the case of personal computer, for example, arithmetic elements are driven at about 1.65 to 3.3 V and electric circuits on the logic board are driven at about 5 V. Electronic components such as magnetic memory, which involve physical movement, works at 12 V, and liquid crystal display devices work at about 150 to 250 V. These electrical products are provided with a power source, such as AC adaptor, secondary battery, and fuel cell, to supply electric power at a prescribed voltage. They are also provided with a means to raise or lower the voltage of output from the power source so that individual electric circuits operate at an adequate voltage.

Figure 8:
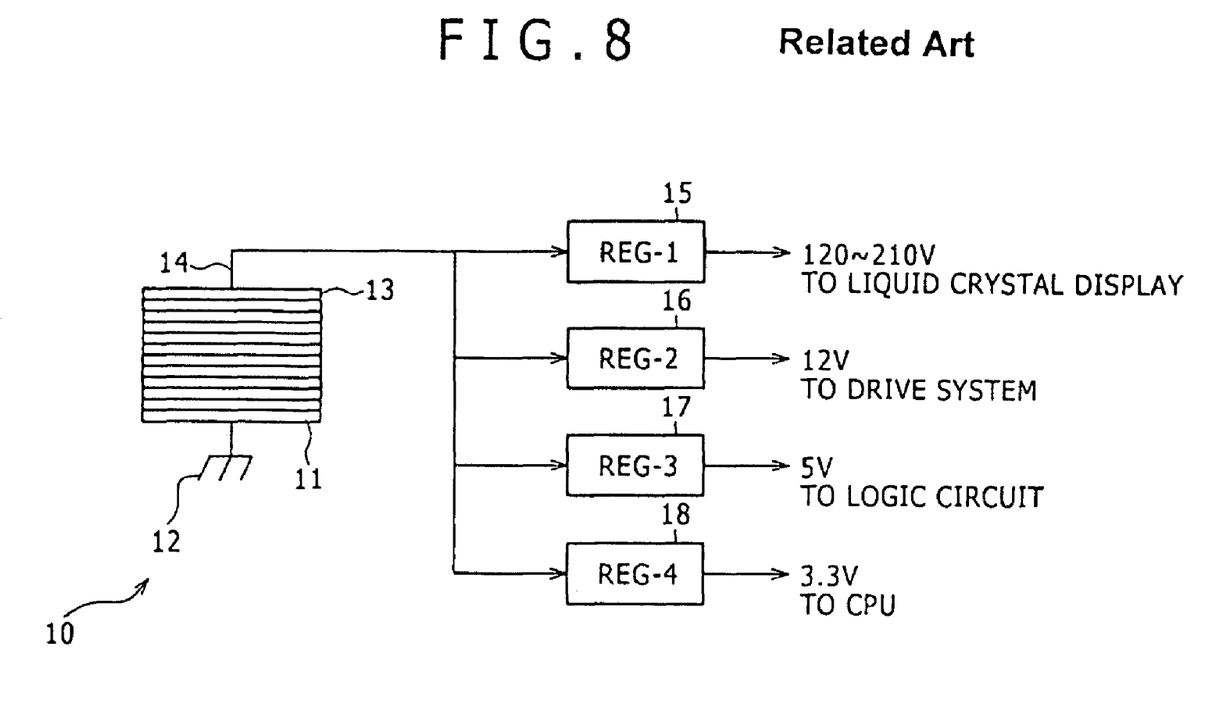
FIG. 8 is a schematic diagram illustrating the method of voltage supply of the fuel cell of conventional stack cell structure.

FIG. 8 shows an example of the conventional system in which a fuel cell is used as a power source for an electrical product having more than one electric circuit. In FIG. 8, the fuel cell 10 is of stack type composed of several cells placed one over another, so that layered cells are connected in series for generated current. The lowermost cell 11 is connected to the ground potential 12 and the uppermost cell 13 is connected to the electrode terminal 14.

The electrode terminal 14 is connected to the regulators to convert voltage which are arranged in parallel. The regulators 15, 16, 17, and 18 are connected respectively to a liquid crystal display, a circuit for the drive system with physical movement, a logic board, and an arithmetic element, so that they supply voltage at different levels suitable for individual circuits.

The regulators 15, 16, 17, and 18, which are connected to the electrode terminal 14, raise or lower the voltage supplied from the electrode terminal 14. The regulators receive the same voltage from the fuel cell 10 but their output voltage varies from one regulator to another. This means that the ratio of voltage increase or decrease greatly differs among the regulators 15, 16, 17, and 18.

In addition, the fuel cell usually greatly varies in voltage depending on load current. The disadvantage of supplying an output from the single electrode terminal 14 to various electric circuits is that the operation of one electric circuit affects other electric circuits connected thereto. This makes it difficult to minimize energy loss. The above-mentioned situation adversely affects individual elements, thereby reducing the power generating efficiency.

It is an object of the present invention to provide a fuel cell and a voltage supply method which are designed to supply power to various electric circuits in a stable manner.

DISCLOSURE OF THE INVENTION

The present invention to address the above-mentioned problem is directed to a fuel cell of stack structure having generating elements placed one over another, characterized in that a first one of said generating elements has a first output terminal attached thereto and a second one of said generating elements has a second output terminal attached thereto, with said first output terminal and said second output terminal differing in potential from each other.

The fuel cell of stack structure with output terminals attached to different generating elements as mentioned above produces a potential across the output electrodes which corresponds to the number of generating cells connected in series. Thus the voltage from the output electrodes can be made to vary. If adequate output terminals are selected according to the voltage required by the connected electric circuit, the fuel cell can supply the voltage converting regulator with an optimal voltage.

The first output terminal may be connected to the first voltage converting regulator and the second output terminal may be connected to the second voltage converting regulator. Also, the first and second voltage converting regulators may differ from each other in the efficiency of voltage conversion.

The present invention to address the above-mentioned problem is directed to a fuel cell of stack structure having generating elements placed one over another, characterized in that a first one of said generating elements has a first output terminal attached thereto and a second one of said generating elements has a second output terminal attached thereto, with said first output terminal and said second output terminal differing in area from each other.

The fuel cell of stack structure with output terminals attached to different generating elements as mentioned above produces a potential across the output electrodes which corresponds to the number of generating cells connected in series. Thus the voltage from the output electrodes can be made to vary. If adequate output terminals are selected according to the voltage required by the connected electric circuit, the fuel cell can supply the voltage converting regulator with an optimal voltage.

The advantage of making the generating elements differ from each other in area is that the current density per unit area can be made almost equal for all the generating elements. This permits the fuel cell to continue the power generating reaction in a stable manner.

The present invention to address the above-mentioned problem is directed to a fuel cell of stack structure having stack cell units each composed of generating elements placed one over another, characterized in that the generating elements constituting a first stack cell unit in said stack cell units differs in area from the generating elements constituting a second stack cell unit in said stack cell units.

The fuel cell of stack structure with stack cell units each differing in the number of stack cell units offers the advantage that the output voltage varies from on stack cell unit to another. If an adequate stack cell unit is selected according to the voltage required by the connected electric circuit, the fuel cell can supply the voltage converting regulator with an optimal voltage.

The generating elements constituting the first stack cell unit may differ in area from the generating elements constituting the second stack cell unit. In this way it is possible to adjust the current to be supplied by each stack cell unit.

The present invention to address the above-mentioned problem is directed to a method for voltage supply from a fuel cell of stack structure having stack cell units each composed of generating elements placed one over another, said method utilizing as its output voltage a first potential difference between a first generating element among the generating elements and the ground potential and a second potential difference between a second generating element among the generating elements and the ground potential.

According to the present invention, the fuel cell of stack cell structure utilizes the potential difference between different layers as its output voltage, which is proportional to the number of layers connected to each other in series. This arrangement permits the fuel cell to produce any desired output voltage from adequately selected layers of cell. Thus the fuel cell supplies an optimal voltage to the voltage converting regulator when proper layers are selected according to the voltage required by the electric circuit connected thereto.

In this case, the fuel cell may be formed such that the first generating element differs in area from the second generating element. The resulting fuel cell produces an approximately identical current density per unit area for all the generating elements, and this leads to a stable continuous electric power generation.

The present invention to address the above-mentioned problem is directed to a fuel cell of stack structure having stack cell units each composed of generating elements placed one over another, characterized in that the generating elements constituting a first stack cell unit among the stack cell units is approximately equal in area to the generating elements constituting a second stack cell unit among the stack cell units and the generating elements constituting a first stack cell unit among the stack cell units are different in number from the generating elements constituting a second stack cell unit among the stack cell units.

If the stack cell units are constructed such that the generating elements constituting each stack cell unit are approximately equal in area but different in number, then each stack cell unit supplies a different voltage. Thus the fuel cell supplies an optimal voltage to the voltage converting regulator when an adequate stack cell unit is selected for the voltage required by the electric circuit connected thereto. That the generating elements in each stack cell unit are approximately equal in area contributes to cost reduction through standardization of parts and simplifies the design and production of the fuel cell.

The present invention to address the above-mentioned problem is directed to a fuel cell having a first group of generating units electrically connected in series and a second group of generating units electrically connected in series, each generating unit being composed of layered generating elements, characterized in that the number of generating units constituting the first group differs from the number of generating units constituting the second group.

That the first group of generating units differs from the second group of generating units in the number of generating units constituting each group means that the two groups differ in voltage they supply. Thus, if an adequate group of generating units is selected according to the voltage required by the connected electric circuit, the fuel cell will supply an optimal voltage to the voltage converting regulator. Moreover, if the generating elements in each of generating units constituting each group of generating units are specified with standardized number, output voltage, and area, the fuel cell will be designed and produced in a simple manner at a low cost.

The present invention to address the above-mentioned problem is directed to a fuel cell having generating units each composed of generating elements, characterized in that said generating units have a switchable electrical connection.

Switching the electrical connection between generating units permits the output voltage to increase when the generating units are connected in series and permits the output current to increase when the generating units are connected in parallel. Thus the fuel cell can supply an adequate power in response to load operation.

The present invention to address the above-mentioned problem is directed to a method for voltage supply from a fuel cell having generating units each composed of generating elements, characterized in that said fuel cell supplies output voltage as the electrical connection between said generating units is switched.

Switching the electrical connection between generating units permits the output voltage to increase when the generating units are connected in series and permits the output current to increase when the generating units are connected in parallel. Thus the fuel cell can supply an adequate power in response to load operation.

BEST MODE FOR CARRYING OUT THE INVENTION

The First Embodiment

A detailed description of the fuel cell and voltage supply method according to the present invention will be given below with reference to the accompanying drawings. The present invention is not restricted to the following description but can be properly modified within the scope thereof.

Figure 1:
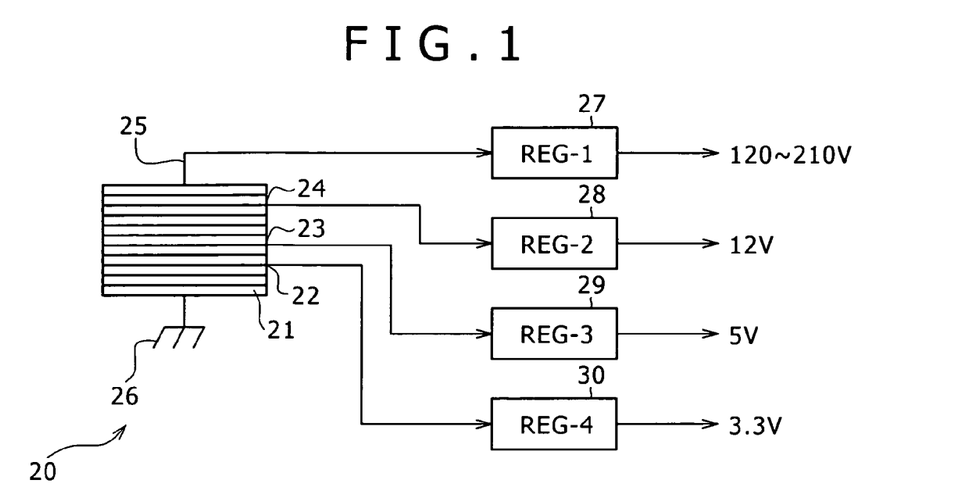
FIG. 1 is a schematic diagram showing the structure of the fuel cell pertaining to the first embodiment.

FIG. 1 is a schematic diagram showing the structure of the fuel cell pertaining to the first embodiment. There is shown a generating section 20 of stack cell structure which is composed of generating elements connected to each other in series, each generating element consisting of bonded bodies (as generators) held between separators. The number of the layered generating elements is not limited to 11 as shown in FIG. 1, but there may be as many generating elements as necessary to provide power to drive electronic equipment. According to this embodiment, the generating section 20 is composed of generating elements of the same area.

The lowermost generating element 21 of the generating section 20 is connected to the ground potential. The generating elements at the third, fifth, and ninth layers (from bottom) and the uppermost layer have the electrode terminals 22, 23, 24, and 25, respectively, which are connected to the voltage converting regulators 30, 29, 28, and 27, respectively.

Each voltage converting regulator changes the voltage supplied from the generating section 20 into the one suitable for individual electric circuits. For example, the regulator 27 supplies 120-210 V to a liquid crystal display device. The regulator 28 supplies 12 V to a circuit for physical mechanism. The regulator 29 supplies 5 V to a logic board. The regulator 30 supplies 3.3 V to an arithmetic element.

Each generating element in the generating section of stack cell structure consists of two separators and one bonded body held between them. The separator has a fuel gas passage and an air passage (which are not shown). The air passage supplies air to the oxygen electrode of each generating element in the generating section. The fuel gas passage supplies hydrogen to the fuel electrode of each generating element in the generating section.

The bonded body consists of two electrodes and a solid polymeric electrolytic membrane held between them. The solid polymeric electrolytic membrane (which becomes ionically conductive upon moisture absorption) may be that of sulfonic acid type. The electrode may be one which supports a catalyst to promote the generating reaction.

The bonded body has a sealing material arranged near its periphery. This sealing material seals the gap between the separator and the bonded body when the stack cell structure is formed for the generating section 20. The sealing material should be formed from a substance that completely insulates the separator and the bonded body from each other at their periphery. The sealing material should also be formed from a substance with high conductivity to help heat dissipation from the generating section 20.

In each generating element, the fuel electrode of the bonded body receives fuel through the fuel gas passage and the oxygen electrode receives oxygen through the air passage, so that the following reactions take place in the bonded body, thereby yielding water.

$$H_2 \rightarrow 2H^+ + 2e^- \text{ and } \tfrac{1}{2}O_2 + 2H^+ + 2e^- = H_2O$$

Hydrogen gas ($H_2$) gives rise to protons at the fuel electrode of the bonded body, and dissociated protons ($H^+$) migrate to the oxygen electrode across the solid polymeric electrolytic membrane and then react with oxygen (air) at the oxygen electrode of the bonded body. Thus these reactions generate the electromotive force.

The electrode terminal 22 is connected in series to the third layer (from bottom) of the generating elements, whose lowermost layer is connected to the ground potential 26, so that the potential of the electrode terminal 22 equals the sum of electromotive force generated by three layers of the generating elements. Likewise, the potential of the electrode terminal 23 equals the sum of electromotive force generated by five layers of the generating elements, and the potential of the electrode terminal 25 equals the sum of electromotive force generated by eleven layers of the generating elements.

Consequently, the electrode terminals 22, 23, 24, and 25 vary in potential and supply different voltages to the regulators 30, 29, 28, and 27 connected thereto. Assuming that each generating element produces an electromotive force of 0.6 V, the regulators 30, 29, 28, and 27 are supplied with 1.8 V, 3.0 V, 5.4 V, and 6.6 V, respectively.

In the above-mentioned case, the regulators 30, 29, 28, and 27 convert 1.8 V, 3.0 V, 5.4 V, and 6.6 V into 3.3 V, 5 V, 12 V, and 120-210 V, respectively.

As mentioned above, each stack cell unit consists of more than one generating element and is provided with an output terminal, so that it supplies an optimal voltage to each regulator. Thus the regulator works at an adequate ratio of voltage increase or decrease.

The Second Embodiment

The second embodiment demonstrates a fuel cell and a method for voltage supply from it, said fuel cell being characterized in that its stack cell unit consists of generating elements varying in area. Incidentally, description of the same parts as used in the first embodiment is omitted.

Figure 2:
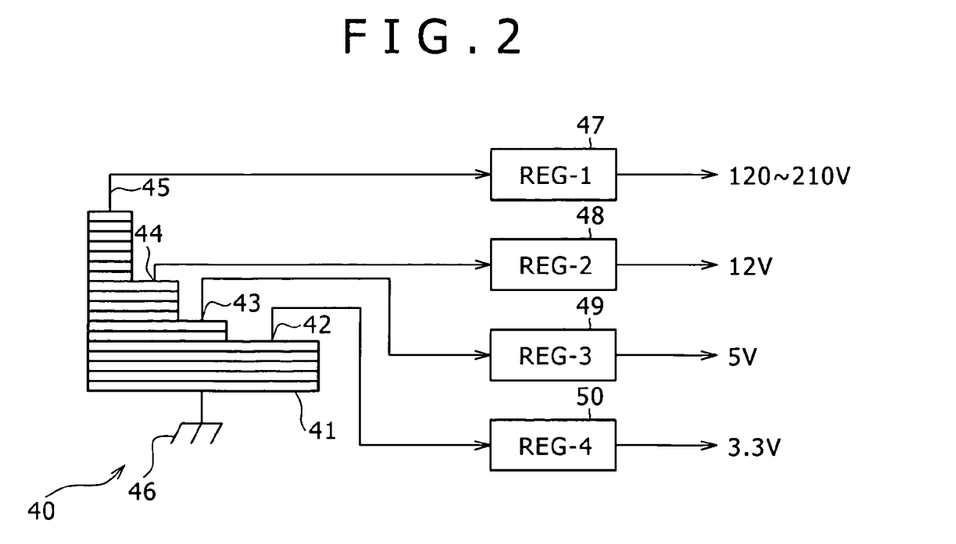
FIG. 2 is a schematic diagram showing the structure of the fuel cell pertaining to the second embodiment.

FIG. 2 is a schematic diagram showing the structure of the fuel cell pertaining to the second embodiment. There is shown a generating section 40 of stack cell structure which is composed of generating elements connected to each other in series, each generating element consisting of bonded bodies (as generators) held between separators. The generating elements in the generating section 40 differ in area from each other as shown in FIG. 2. The number of the layered generating elements constituting the generating section 40 is not limited to the one shown in FIG. 2, but there may be as many generating elements as necessary to provide power to drive electronic equipment.

The lowermost generating element 41 of the generating section 40 is connected to the ground potential. The generating elements at the fifth, seventh, and eleventh layers (from bottom) and the uppermost layer have the electrode terminals 42, 43, 44, 44, and 45, respectively, which are connected to the voltage converting regulators 50, 49, 48, and 47, respectively.

The generating elements constituting the generating section 40 differ in area from each other. In the case illustrated in FIG. 2, the generating element composed of the lowermost layer to the fifth layer has the largest area. The generating element composed of the sixth and seventh layers has the second largest area. The generating element composed of the eighth to eleventh layers has the third largest area. The generating element composed of the twelfth to eighteenth layers has the smallest area.

Each voltage converting regulator changes the voltage supplied from the generating section 40 into the one suitable for individual electric circuits. For example, the regulator 47 supplies 120-210 V to a liquid crystal display device. The regulator 48 supplies 12 V to a circuit for physical mechanism. The regulator 49 supplies 5 V to a logic board. The regulator 50 supplies 3.3 V to an arithmetic element.

Each generating element is identical in structure and the generating section 40 is also identical in generating reaction to that in the first embodiment; therefore, their description is omitted.

Being connected in series to the fifth layer of generating element from the lowermost layer which is connected to the ground potential 46, the electrode terminal 42 produces a potential equal to the sum of electromotive forces due to five layers of generating elements. Likewise, the electrode terminals 43, 44, and 45 produce a potential equal respectively to the sum of electromotive forces due to seven layers, eleven layers, and eighteen layers of generating elements.

Thus the electrode terminals 42, 43, 44, and 45 produce different potentials and hence supply different voltages to the regulators 50, 49, 48, and 47 connected thereto respectively.

The current generated by the lowermost layer of generating element flows to the electric circuits through the electrode terminals 42, 43, 44, and 45 attached to individual layers connected in series. By contrast, the current generated by the uppermost layer (or the eleventh layer) flows to the electric circuit through the electrode terminal 44.

It follows that the electromotive force due to individual generating elements relates to the area of the bonded bodies and the current generated by generating elements close to the lowermost layer (at the ground potential 46) is supplied to electric circuits through more than one electrode terminal. Consequently, if the area of the generating elements to which each electrode terminal is attached is properly adjusted, then the current density per unit area can be made approximately equal for all the generating elements.

The efficiency of generating elements usually varies depending on current density and temperature. Moreover, the solid polymeric electrolytic membrane in each generating element deteriorates at different rates depending on current density. If the current density per unit area of each generating element is made approximately the same, then the solid polymeric electrolytic membrane in each generating element may be kept in almost identical conditions.

Thus, with the area of each generating element properly adjusted, the current density per unit area of each generating element can be made approximately the same and individual generating elements can be made to operate under almost identical conditions. This leads to stable continuous generation.

With the output terminals attached to generating elements in the generating section so that an optimal voltage is supplied to each regulator, an adequate ratio of voltage increase or decrease is maintained at the regulator.

The Third Embodiment

The third embodiment demonstrates a fuel cell of stack cell structure and a method for voltage supply from it. Incidentally, description of the same parts as used in the first embodiment is omitted.

Figure 3:
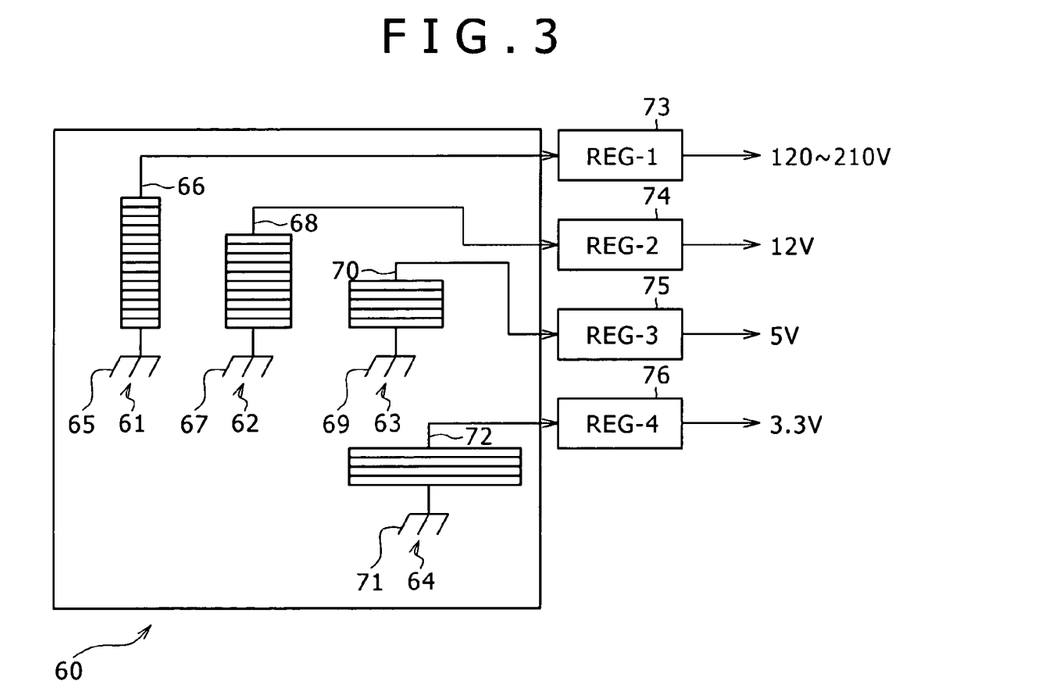
FIG. 3 is a schematic diagram showing the structure of the fuel cell pertaining to the third embodiment.

FIG. 3 is a schematic diagram showing the structure of the fuel cell pertaining to the third embodiment. There is shown a generating section 60 of stack cell structure which is composed of discrete stack cell units, 61, 62, 63, and 64. Each of the stack cell units 61, 62, 63, and 64 has generating elements, each consisting of separators and a bonded body (as generator) held between them. The generating elements are connected in series. The number of the layered generating elements and the number of the stack cell units constituting the generating section 60 are not limited to the one shown in FIG. 3, but there may be as many as necessary to provide power to drive electronic equipment. According to this embodiment, the generating elements constituting each of the stack cell units 62, 62, 63, and 64 differ in area from one stack cell unit to another. Also, the number of generating elements differs from one stack cell unit to another.

The generating element at the bottom of the stack cell unit 61 is connected to the ground potential 65, and the generating element at the top of the stack cell unit 61 has the electrode terminal 66. Likewise, the generating elements at the bottom of each of the stack cell units 62, 63, and 64 are connected respectively to the ground potential 67, 69, and 71 and the generating elements at the top of each of the stack cell units 62, 63, and 64 have respectively the electrode terminals 68, 70, and 72. The electrode terminals 66, 68, 70, and 72 are connected respectively to the regulators 73, 74, 75, and 76 for voltage adjustment.

Each voltage converting regulator changes the voltage supplied from the generating section 60 into the one suitable for individual electric circuits. For example, the regulator 73 supplies 120-210 V to a liquid crystal display device. The regulator 74 supplies 12 V to a circuit for physical mechanism. The regulator 75 supplies 5 V to a logic board. The regulator 76 supplies 3.3 V to an arithmetic element.

The area and number of generating elements in one stack cell unit differ from those in another stack cell unit. The electrode terminals 66, 68, 70, and 72 differ in potential from one another, so that they supply voltage at different levels to the regulators 73, 74, 75, and 76 connected thereto.

As in the second embodiment mentioned above, the current density per unit area can be made almost identical for generating elements by adjusting the area of generating elements in each stack cell unit. Thus, individual generating elements continuously operate under stable conditions in almost identical environments.

Since the number of generating elements is properly adjusted in each stack cell structure, the regulator maintains an adequate ratio of voltage increase or decrease. In addition, the individually formed stack cell unit can be made small, which permits effective use of space in the electric machine in which the fuel cell is installed.

The Fourth Embodiment

The fourth embodiment demonstrates a fuel cell of stack cell structure and a method for voltage supply from it. Incidentally, description of the same parts as used in the first embodiment is omitted.

Figure 4:
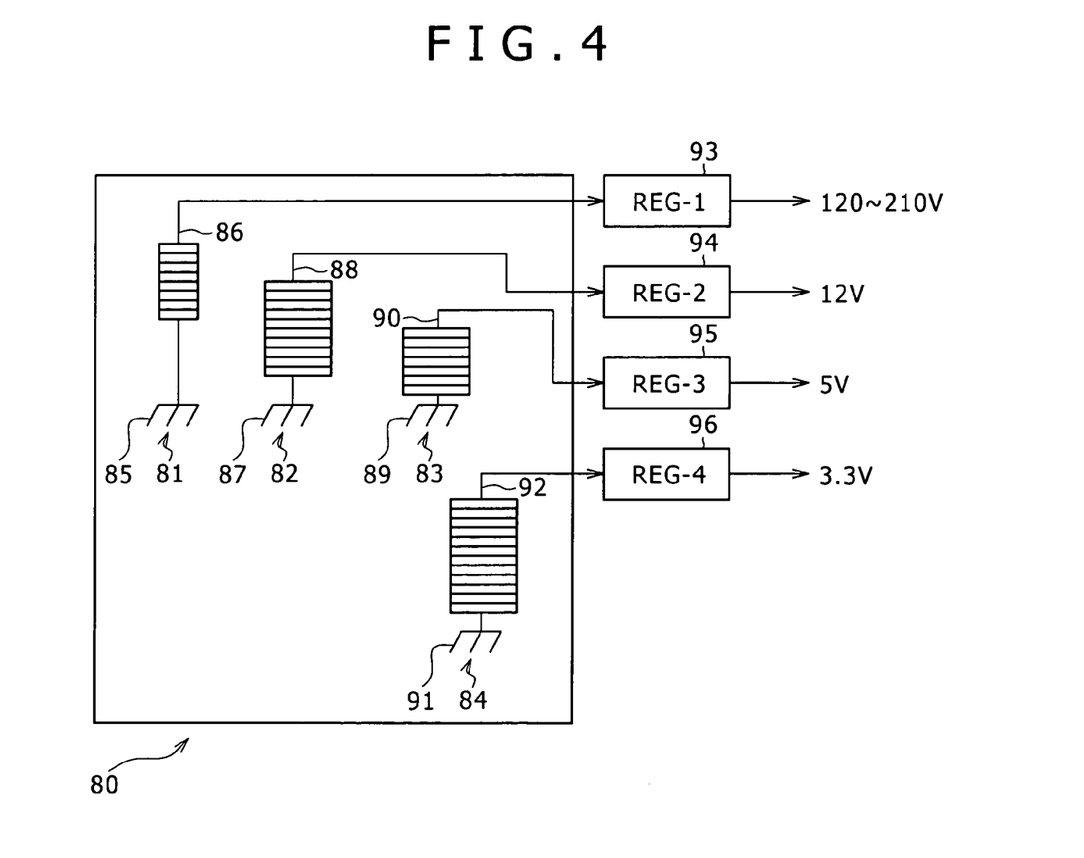
FIG. 4 is a schematic diagram showing the structure of the fuel cell pertaining to the fourth embodiment.

FIG. 4 is a schematic diagram showing the structure of the fuel cell pertaining to the fourth embodiment. There is shown a generating section 80 of stack cell structure which is composed of discrete stack cell units, 81, 82, 83, and 84. Each of the stack cell units 81, 82, 83, and 84 has generating elements, each consisting of separators and a bonded body (as generator) held between them. The generating elements are connected in series. The number of the layered generating elements and the number of the stack cell units constituting the generating section 80 are not limited to the one shown in FIG. 4, but there may be as many as necessary to provide power to drive electronic equipment. According to this embodiment, the generating elements constituting each of the stack cell units 81, 82, 83, and 84 are almost identical in area. Also, the number of generating elements differs from one stack cell unit to another.

The generating element at the bottom of the stack cell unit 81 is connected to the ground potential 85, and the generating element at the top of the stack cell unit 81 has the electrode terminal 86. Likewise, the generating elements at the bottom of each of the stack cell units 82, 83, and 84 are connected respectively to the ground potential 87, 89, and 91 and the generating elements at the top of each of the stack cell units 82, 83, and 84 have respectively the electrode terminals 88, 90, and 92. The electrode terminals 86, 88, 90, and 92 are connected respectively to the regulators 93, 94, 95, and 96 for voltage adjustment.

Each voltage converting regulator changes the voltage supplied from the generating section 80 into the one suitable for individual electric circuits. For example, the regulator 93 supplies 120-210 V to a liquid crystal display device. The regulator 94 supplies 12 V to a circuit for physical mechanism. The regulator 95 supplies 5 V to a logic board. The regulator 96 supplies 3.3 V to an arithmetic element.

The generating elements in one stack cell unit are almost identical in area but different in number. The electrode terminals 86, 88, 90, and 92 differ in potential from one another, so that they supply voltage at different levels to the regulators 93, 94, 95, and 96 connected thereto.

Since the number of generating elements is properly adjusted in each stack cell structure so that the stack cell unit supplies an optimal voltage to the regulators, the regulator maintains an adequate ratio of voltage increase or decrease. In addition, the individually formed stack cell unit can be made small, which permits effective use of space in the electric machine in which the fuel is installed. That the generating elements constituting each stack cell unit have almost the same area permits the design and production of the fuel cell in a simple manner.

The Fifth Embodiment

The fifth embodiment demonstrates a fuel cell and a method for voltage supply from it, said fuel cell being composed of generating units (each having generating elements) connected in series to one another. Incidentally, description of the same parts as used in the first embodiment is omitted.

Figure 5:
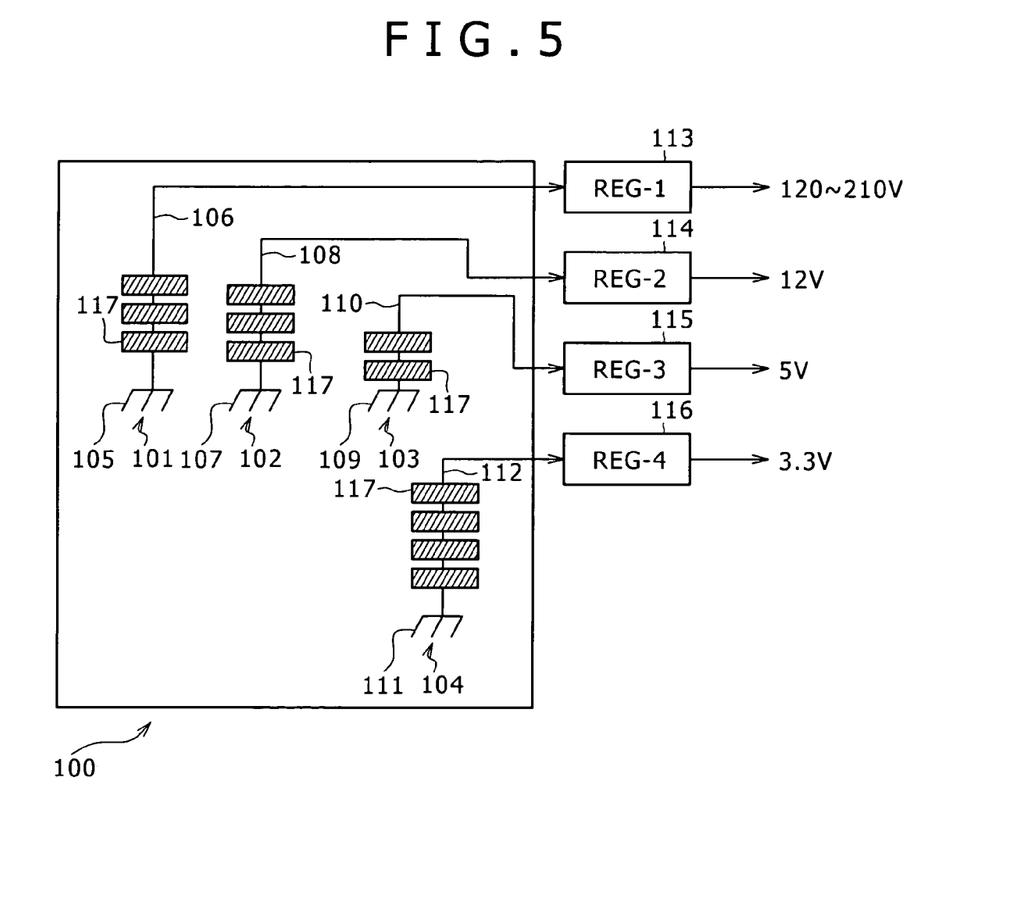
FIG. 5 is a schematic diagram showing the structure of the fuel cell pertaining to the fifth embodiment.

FIG. 5 is a schematic diagram showing the structure of the fuel cell pertaining to the fifth embodiment. The generating section 100 is composed of four unit layers 101, 102, 103, and 104, each consisting of more than one generating unit 117 connected in series to one another. Incidentally, the number of the unit layers constituting the generating section 100 and the number of the generating units constituting each unit layer are not limited to those shown in FIG. 5, but there may be as many as necessary to provide power to drive electronic equipment.

The generating unit 117 has the generating element of the fuel cell, and the generating element generates electricity and supplies current as it is fed with fuel and oxygen. Each unit layer 101, 102, 103, and 104 has more than one generating unit 117 which are identical in specification. Each generating unit has the same number of generating elements of identical area, so that all the generating units produce almost identical voltage and electric power.

The generating unit 117 at the bottom of the unit layer 101 is connected to the ground potential 105, and the generating element at the uppermost layer has the electrode terminal 106. Likewise, the generating unit 117 at the bottom of each of the unit layers 102, 103, and 104 is connected respectively to the ground potential 107, 109, and 111 and each of the generating units at the uppermost layer has the electrode terminals 108, 110, and 112, respectively. The electrode terminals 106, 108, 110, and 112 are connected respectively to the regulators 113, 114, 115, and 116 for voltage adjustment.

Each voltage converting regulator changes the voltage supplied from the generating section 100 into the one suitable for individual electric circuits. For example, the regulator 113 supplies 120-210 V to a liquid crystal display device. The regulator 114 supplies 12 V to a circuit for physical mechanism. The regulator 115 supplies 5 V to a logic board. The regulator 116 supplies 3.3 V to an arithmetic element.

The generating units 117 in each unit layer are almost identical in output, but the number of layers of the generating units 117 in each unit layer differs. Consequently, the electrode terminals 106, 108, 110, and 112 differ in potential from one another and hence they supply different voltages to the regulators 113, 114, 115, and 116.

Since the number of generating units in each unit layer is properly adjusted, the regulator maintains an adequate ratio of voltage increase or decrease. In addition, the generating units 117 in each unit layer may be made identical in specification, which leads to cost reduction through parts standardization and permits the fuel cell to be designed and produced in a simple manner.

The Sixth Embodiment

The sixth embodiment demonstrates a fuel cell and a method for voltage supply from it, said fuel cell being composed of generating units (each having generating elements) and said method consisting of switching electrical connection between the generating units. Incidentally, description of the same parts as used in the first embodiment is omitted.

Figure 6:
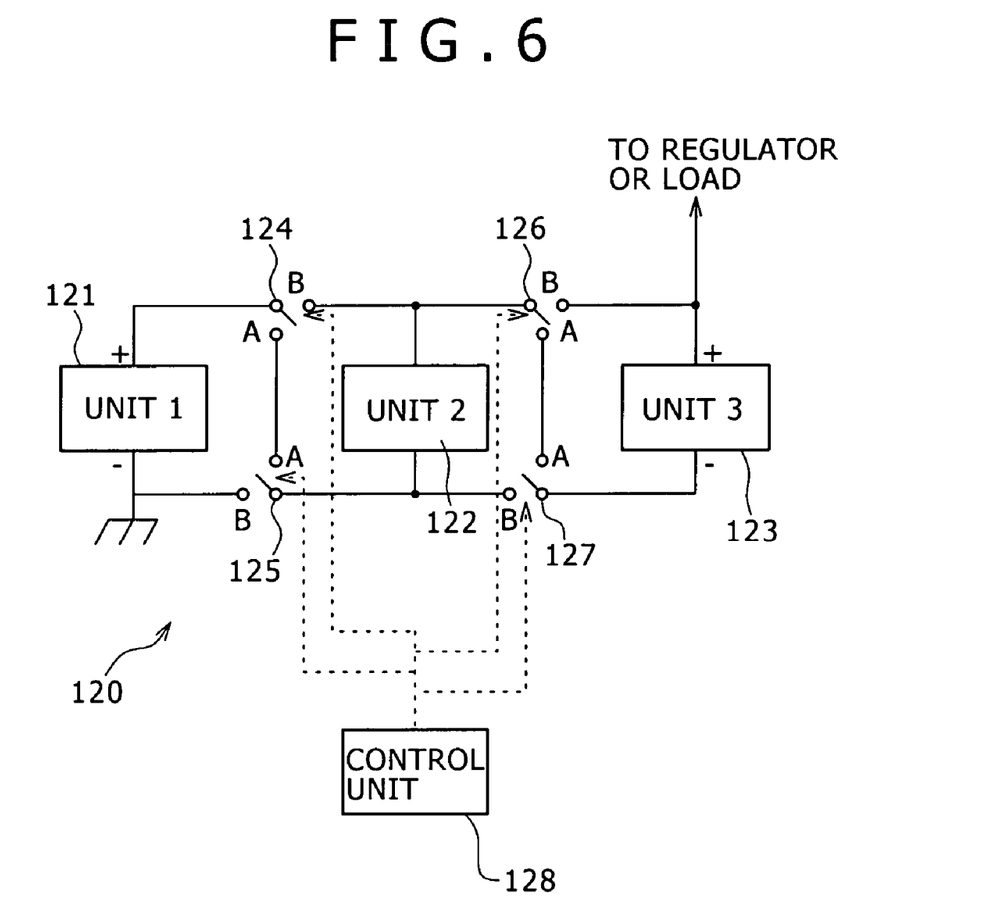
FIG. 6 is a schematic diagram showing the structure of the fuel cell pertaining to the sixth embodiment.

FIG. 6 is a schematic diagram showing the structure of the fuel cell pertaining to the sixth embodiment. The generating section 120 is composed of three generating units 121, 122, and 123, with their positive electrodes and negative electrodes connected to each other through electrical wiring. The generating section 120 has the control unit 128 to switch the direction of connection of the selector switches 124, 125, 126, and 127, so that the passage of current is changed. The selector switches 124, 125, 126, and 127 may be assembled from low-resistance semiconductor switches.

Each of the generating units 121, 122, and 123 is composed of generating elements for the fuel cell. The generating unit generates electricity and supplies current as it is fed with fuel and oxygen. Incidentally, the number of the generating units constituting the generating section 120 is not limited to the one shown in FIG. 6, but there may be as many as necessary to provide power to drive electronic equipment. Although the generating section 120 shown in FIG. 6 is composed only of generating units, it may be composed partly of generating units and partly of secondary batteries such as lithium ion batteries.

The control unit 128 monitors the operation of the load to which the generating section 120 supplies electric power and also controls the connection of the selector switches 124, 125, 126, and 127. It previously records the output mode in which the generating section 120 generates electric power in response to load operation, and it changes the direction of connection of the selector switches to alter the output mode of the generating section 120 when any change occurs in load operation. FIG. 6 shows the arrangement by which the control unit 128 changes the direction of connection of the selector switches 124, 125, 126, and 127. This arrangement may be modified such that the selector switches are switched manually.

In the case shown in FIG. 6, the positive electrode of the generating unit 121 is connected to the selector switch 124 and the negative electrode of the generating unit 121 is connected to the selector switch 125 and the ground potential. Also, the positive electrode of the generating unit 122 is connected to the selector switches 124 and 126 and the negative electrode of the generating unit 122 is connected to the selector switches 125 and 127. Further, the positive electrode of the generating unit 123 is connected to the selector switch 126, the regulator, and the load, and the negative electrode of the generating unit 123 is connected to the selector switch 127.

When each generating unit is fed with fuel and oxygen so that the generating elements therein generate electric power, and when the selector switches 124, 125, 126, and 127 are turn to the direction a or b (shown in FIG. 6), the electric wiring is connected and current is supplied to the regulator or load. At this time, the electrical connection of the generating units is switched by properly selecting the direction of the selector switches.

Figure 7A:
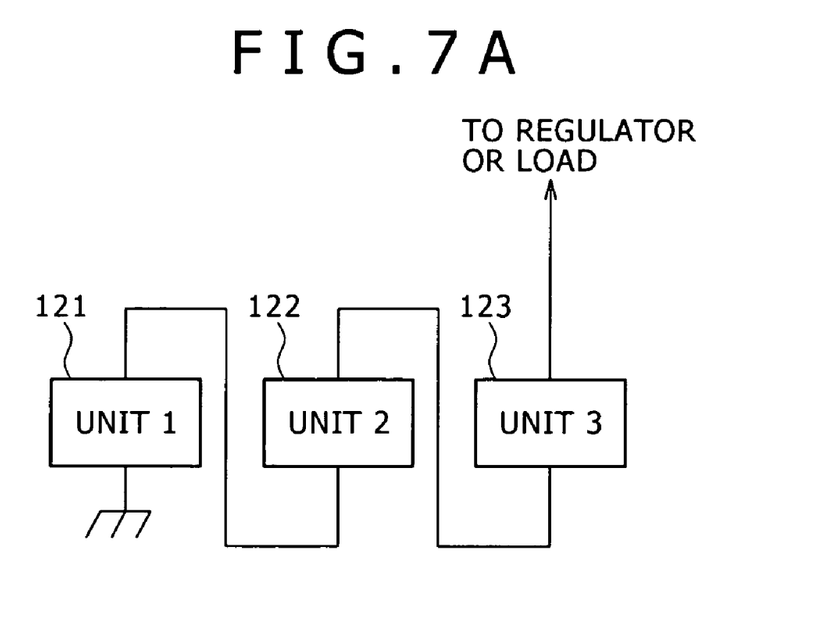
FIG. 7A is a schematic diagram showing the serial electrical connection between the generating units of the fuel cell pertaining to the sixth embodiment.
Figure 7B:
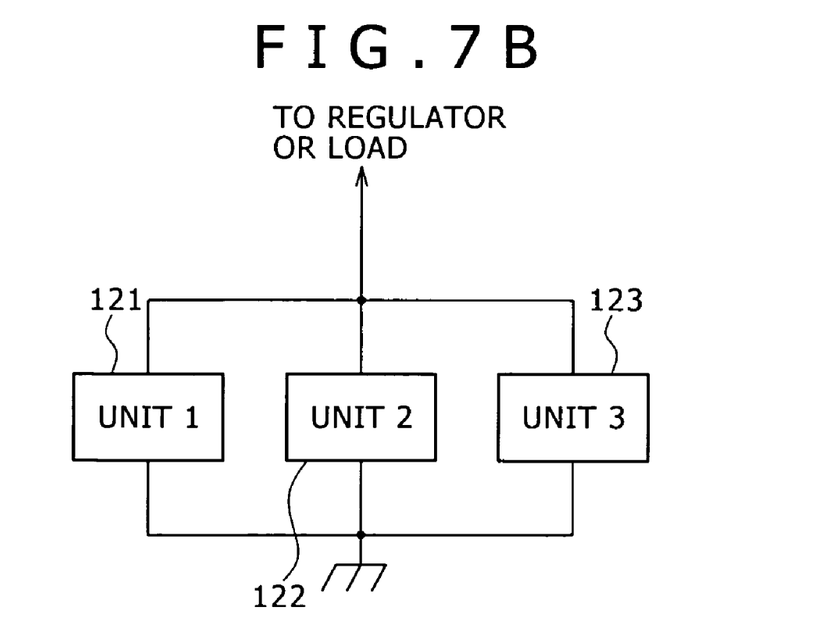
FIG. 7B is a schematic diagram showing the parallel electrical connection between the generating units of the fuel cell pertaining to the sixth embodiment.

FIGS. 7A and 7B are diagrams illustrating the electrical connection between the generating units which is established by switching the selector switches. FIG. 7A shows the current flow that takes place when all of the selector switches 124, 125, 126, and 127 are turned to the direction a as shown in FIG. 6. FIG. 7B shows the current flow that takes place when all of the selector switches 124, 125, 126, and 127 are turned to the direction b as shown in FIG. 6.

In the case where the generating units 121, 122, and 123 are connected in series as shown in FIG. 7A, the voltage that is supplied to the regulator or load is the sum of electromotive force generated by the generating units. This output mode is suitable to supplying electric power to a load which needs a high voltage rather than a large current. In the case where the generating units 121, 122, and 123 are connected in parallel as shown in FIG. 7B, the current that is supplied to the regulator or load is the sum of current generated by the generating units. This output mode is suitable to supplying electric power to a load which needs a large current rather than a high voltage.

FIG. 6 shows an example in which the generating units are connected to the selector switches 124, 125, and 126 which are turned to the direction a or b. This arrangement may be modified such that four generating units are installed, with two each of them connected in parallel through the selector switch and the two groups connected in series through the selector switch. In this case, the voltage is halved and the current is doubled. Thus an adequate output mode can be selected by switching the direction of connection of the selector switches or by switching the electrical connection between the generating units.

Switching the electrical connection between the generating units increases the output voltage if the generating units are connected in series. Also, switching the electrical connection between the generating units increases the output current if the generating units are connected in parallel. Thus the fuel cell can supply an adequate electric power according to the state of load operation.

If the output terminals are attached to the generating elements in different layers in the fuel cell of stack cell structure, the potential across the output terminals corresponds to the number of layers of the generating cells connected in series. Therefore, the voltage obtained from the individual output terminals varies and the fuel cell supplies an adequate voltage to the voltage converting regulators if the output terminals are selected according to the voltage required by the electric circuit connected thereto.

In this case, the first output terminal may be connected to the first voltage converting regulator and the second output terminal may be connected to the second voltage converting regulator. In addition, the first voltage converting regulator and the second voltage converting regulator may differ from each other in the ratio of voltage conversion.

If the output terminals are attached to the generating elements in different layers in the fuel cell of stack cell structure, the potential across the output terminals corresponds to the number of layers of the generating cells connected in series. Therefore, the voltage obtained from the individual output terminals varies and the fuel cell supplies an adequate voltage to the voltage converting regulators if the output terminals are selected according to the voltage required by the electric circuit connected thereto.

If the generating elements differ from each other in area, then all the generating elements have an approximately the same current density per unit area, and this permits stable continuous generating reactions.

In the case of a fuel cell composed of more than one stack cell unit, with generating elements therein varying in area, the individual stack cell units vary in potential they supply. Therefore, an adequate voltage can be supplied to the voltage converting regulators if stack cell units are properly selected for the voltage required by the electric circuit connected thereto.

In this case, the number of generating elements constituting the first stack cell unit may differ from the number of generating elements constituting the second stack cell unit. Thus the voltage to be supplied by each stack cell unit may be adjusted.

Stack cell units may be formed in such a way that the generating elements constituting each stack cell unit are almost identical in area but the number of generating elements constituting one stack cell unit differs from the number of generating elements constituting another stack cell unit. This arrangement allows each stack cell unit to supply voltage at different levels. Therefore, the fuel cell supplies an adequate voltage to the voltage converting regulators if the stack cell units are properly selected according to the voltage required by the electric circuit connected thereto. That the generating elements in each stack cell unit are approximately equal in area contributes to cost reduction through standardization of parts and simplifies the design and production of the fuel cell.

With the number of generating units varied, the voltage supplied by each generating unit varies. Therefore, an adequate voltage can be supplied to the voltage converting regulators if the generating units are properly selected in response to the voltage required by the electric circuit connected thereto. The generating units in each unit layer may be so specified as to have an equal area, which leads to cost reduction through parts standardization and permits the fuel cell to be designed and produced in a simple manner.

The result of changing the electrical connection between the generating units is that the output voltage is made large when the generating units are connected in series and the output current is made large when the generating units are connected in series. Thus the fuel cell can supply an adequate amount of power in response to load operation.

EXPLOITATION IN INDUSTRY

The fuel cell of stack structure with output terminals attached to different generating elements as mentioned above produces a potential across the output electrodes which corresponds to the number of generating cells connected in series. Thus the voltage from the output electrodes can be made to vary. If adequate output terminals are selected according to the voltage required by the connected electric circuit, the fuel cell can supply the voltage converting regulator with an optimal voltage.

The invention claimed is:

1. A method to supply voltage from a fuel cell with a stack structure having stacked cells each cell being an energy generating element, said method comprising the steps of:
 generating power in the stacked cells having a tiered structure;
 obtaining and utilizing a first potential difference between a first generating element among the stacked cells and a ground potential as a first output voltage; and obtaining and utilizing a second potential difference between a second generating element among the stacked cells and the ground potential as a second output voltage, and making available first and second power signals with said first and second output voltages, respectively, wherein, the first generating element differs in size from the second generating element so that said first and second output voltages differ from one another at least based upon said difference in sizes, the first generating element abuts a first plurality of other generating elements each of a size equal to the first generating element, the second generating element abuts a second plurality of other generating elements each of a size equal to the second generating element, and the first plurality of other generating elements abut the second plurality of generating elements such that the generating elements become successively larger across the stacked cells to form the tiered structure.

2. A method to supply voltage from a fuel cell having a tiered structure comprised of first and second energy generating elements, the method comprising the steps of:

providing power signals from said first and second energy generating elements; and switching an electrical connection between said first and second energy generating elements so as to selectively connect said first and second energy generating elements in parallel or in series and thereby selectively supply an output power signal with a selectable output voltage and selectable output current, wherein, the first generating element differs in size from the second generating element so that said first and second output voltages differ from one another at least based upon said difference in sizes, the first generating element abuts a first plurality of other generating elements each of a size equal to the first generating element, the second generating element abuts a second plurality of other generating elements each of a size equal to the second generating element, and the first plurality of other generating elements abut the second plurality of generating elements such that the generating elements become successively larger across the stacked cells to form the tiered structure.

3. The method of claim 1, wherein the first generating element and the second generating element have a same current density per unit area.

4. The method of claim 1, wherein the first generating element and the second generating element are spaced from each other.

5. The method of claim 1, wherein the first plurality of other generating elements and the second plurality of other generating elements differ in quantity.

6. The method of to claim 1, wherein the first generating element and the second generating element have two of three dimensions in a three-dimensional structure which are the same and a third dimension which is different so that the first plurality of other generating elements have a third dimension which is greater than the third dimension of the second plurality of other generating elements.

7. The method of claim 2, wherein the switching is performed manually.

8. The method of claim 2, wherein each of the first and second other generating elements have two of three dimensions in a three-dimensional structure which are the same and a third dimension which differs among the generating elements so that the generating elements differ in area.

9. The method of claim 1, further comprising:

a third plurality of other generating elements that abuts the second plurality of other generating elements and is larger than the second plurality of other generating elements; and a fourth plurality of other generating elements that abuts the third plurality of generating elements and is larger than the third plurality of other generating elements, wherein each of the first, second, third, and fourth other generating elements have two of three dimensions in a three-dimensional structure which are the same and a third dimension which differs among the generating elements so that the generating elements differ in area.

10. The method of claim 2, further comprising:

a third plurality of other generating elements that abuts the second plurality of other generating elements and is larger than the second plurality of other generating elements; and a fourth plurality of other generating elements that abuts the third plurality of generating elements and is larger than the third plurality of other generating elements, wherein each of the first, second, third, and fourth other generating elements have two of three dimensions in a three-dimensional structure which are the same and a third dimension which differs among the generating elements so that the generating elements differ in area.

* * * * *